M. Bradley,
Attaching Handles to Knives.
Nº 49,222.      Patented Aug. 8 1865.
Fig. 1.      Fig. 2.
Fig. 4.
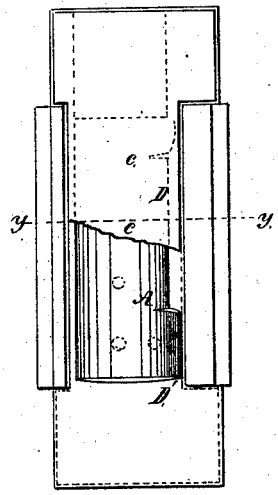
Fig. 5.
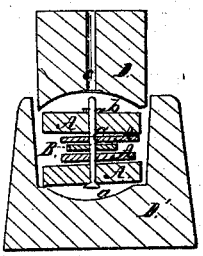
Fig. 3.
Witnesses:      Inventor:

UNITED STATES PATENT OFFICE.

MILES BRADLEY, OF WESTPORT, CONNECTICUT.

IMPROVEMENT IN ATTACHING HORN HANDLES TO KNIVES.

Specification forming part of Letters Patent No. 49,222, dated August 8, 1865.

*To all whom it may concern:*

Be it known that I, MILES BRADLEY, of Westport, in the county of Fairfield and State of Connecticut, have invented a new and Improved Mode of Applying Horn Handles to Machetes and other Knives; and I do hereby declare that the following is a full, clear, and exact description thereof, which will enable those skilled in the art to make and use the same, reference being had to the acccompanying drawings, forming part of this specification, in which—

Figure 1 is a side view of a machete having a handle applied to it according to my invention; Fig. 2, a side view of the same with the horn or stock for the handle applied ready for compressing or molding into proper form and riveting; Fig. 3, a transverse section of Fig. 1, taken in the line $x\ x$, Fig. 1; Fig. 4, a plan or top view of the die by which the handle is molded or compressed into proper form and riveted at the same time; Fig. 5, a transverse section of Fig. 4, taken in the line $y\ y$.

Similar letters of reference indicate corresponding parts.

This invention consists in applying horn handles to machetes and other knives by placing the horn in a soft state on the tang of the implement, with the rivets passing through the horn and tang, and then by means of dies properly constructed molding the horn into proper form while on the tang and riveting the horn or handle on the tang at the same time.

The horn A, composing the handle, is cut out of the desired size and shape, and is placed at each side of the tang B of the implement, two or more pieces being at each side of the tang, as desired. The external pieces, however, compose the main portions of the handle, the internal ones serving for what may be termed a "filling," and they may be of greater or less dimensions, as circumstances may require. This horn, previously to being applied to the tang, is softened by immersion in hot water, or by any other proper means, and rivets C are passed transversely through it and the tang, the rivets being provided with heads $a$ at one end, and having washers $b$ on their opposite ends, as shown in Fig. 5.

D D' represent two dies, one, D, working within the other, D'. These dies are made of a shape corresponding to the desired shape of the handle, and the die D is perforated with holes $c$ to receive the portions of the rivets C above or beyond the washers $b$.

The horn A is compressed or molded into proper form by means of the dies D D', and by the pressure of the dies the heads $a$ of the rivets are countersunk into one side of the handle and the washers $b$ countersunk into the opposite side, as shown in Fig. 3. By this arrangement it will be seen that the handles are applied to the implements in a very expeditious and economical manner, and the handles will not only be perfect, but will also be uniform in appearance, and in consequence of the horn handle having a joint both at the front and rear of the tang the contingency of splitting due to shrinkage is avoided.

I would remark that the ends of the rivets C beyond the washers $b$ are, after the handles are molded, cut off and filed flush with the washers.

Having thus described my invention. I claim as new and desire to secure by Letters Patent—

By means of a die, molding or compressing the horn into the desired form while on the tang and countersinking the heads of the rivets and the washers at one and the same operation, substantially as set forth.

MILES BRADLEY.

Witnesses:
WM. F. MCNAMARA,
M. M. LIVINGSTON.